United States Patent [19]

Harbaugh et al.

[11] 4,154,100

[45] May 15, 1979

[54] METHOD AND APPARATUS FOR STABILIZING THE FLOW COEFFICIENT FOR PITOT-TYPE FLOWMETERS WITH A DOWNSTREAM-FACING PORT

[75] Inventors: James B. Harbaugh, Lakewood, Colo.; Edward F. Brooks, Lawndale, Calif.; Norman A. Alston, Boulder, Colo.

[73] Assignee: Dieterich Standard Corp., Boulder, Colo.

[21] Appl. No.: 867,778

[22] Filed: Jan. 9, 1978

[51] Int. Cl.² .............................................. G01F 1/46
[52] U.S. Cl. ..................................................... 73/212
[58] Field of Search .......................................... 73/212

[56] References Cited

U.S. PATENT DOCUMENTS

| | | | |
|---|---|---|---|
| 1,110,023 | 9/1914 | Wilkinson | 73/212 |
| 1,560,664 | 11/1925 | Cole | 73/212 |
| 3,751,982 | 8/1973 | Lambert | 73/212 |

*Primary Examiner*—Herbert Goldstein
*Attorney, Agent, or Firm*—Edwin L. Spangler, Jr.

[57] ABSTRACT

This invention relates to the novel method for stabilizing the pressure sensed by the downstream-facing port of a pitot tube type flowmeter over a broad flow range, thereby providing a stable and repeatable flow coefficient. The invention comprises localizing the areas of boundary layer separation across deflecting surfaces located upstream of said port by sharply contouring the edges thereof and directing the flowing stream thereacross, and preventing reattachment of said boundary layer by positioning and contouring the surfaces containing said port downstream of said sharply contoured edges so as to continuously lie within the wake of the fluid flowing around the latter over a broad range of flow rates. The invention also encompasses the improved averaging pitot-type flowmeter characterized by flow deflecting means having sharply contoured edges on both sides thereof effective to fix the location at which boundary layer separation occurs over a broad range of laminar and turbulent flow conditions, an upstream-facing impact surface shaped to direct the flowing fluid across said sharply contoured edges, and a downstream-facing surface containing a port for sensing downstream pressure so contoured and positioned relative to said sharply contoured edges as to cooperate therewith in preventing reattachment of the boundary layer under varying flow conditions.

14 Claims, 9 Drawing Figures

METHOD AND APPARATUS FOR STABILIZING THE FLOW COEFFICIENT FOR PITOT-TYPE FLOWMETERS WITH A DOWNSTREAM-FACING PORT

All flowmeters regardless of the type or design have a so-called "flow coefficient" or flow correction factor associated with them which is used to calculate the actual flow rate as a function of the measured one. Quite often, the flow rate is calculated by multiplying this coefficient by some function of the measured flow rate such as a square thereof and it is not necessarily, therefore, a simple multiplication of one by the other. In any event, the use of this correction factor enables the operator to arrive at some value for the actual flow based upon the measured flow sensed by the flowmeter. It follows, therefore, that the accuracy of this correction factor over the range of flows being measured is a key element in the determination of flow rates and the reliance that can be placed thereon.

This flow correction factor is defined as follows:

Flow correction factor = Actual Flow Rate/Instrument Flow Rate

The instrument flow rate in the above equation is calculated on the basis of the instrument output and a mathematical model governing the particular type of fluid flow being measured. For instance, for most liquid flows, the hydraulic equation which assumes that liquids are incompressible is considered most appropriate. On the other hand, for gaseous or vapor flows, a model predicated upon one dimensional isentropic flow is often deemed to be the best approach. Regardless of the mathematics involved, the fact remains that the flow correction factor is nothing more than the ratio of the actual flow rate to the one calculated from the instrument output and an appropriate modeling equation.

It is self evident from the above that the ideal state of affairs would be one in which this flow correction coefficient remained constant over the entire range of flow conditions to be measured and regardless of the characteristics of fluid flowing, i.e. liquid, gaseous, vapor, viscous, thin, heterogeneous, homogeneous, hot, cold, with or without suspended solids, etc. So far as is known, no flowmeter has a flow correction coefficient that does, in fact remain constant under all these conditions.

In fact, very few have a coefficient that remains constant even over a wide range of flow rates with all other factors remaining constant. Such variation in the value of the flow correction coefficient can, however, be tolerated provided that it is minimal and, most significant, repeatable. Unfortunately, this is seldom the case.

The flowmeters shown in U.S. Pat. No. 3,581,565 have been successfully used for may years with far better than average results. These devices produce a differential pressure signal that is proportional to the square of the flow within the pipe or conduit in which they are located. Two or more pairs of sensing ports are provided on the upsteam side of the probe or so-called "bluff body" which cooperate with one another and an averaging tube inside thereof to sense an average dynamic pressure of the fluid impacting thereagainst. A single sensing port centered within the conduit and facing downstream is employed to determine the "static" pressure of the flowing fluid. It is the location of the latter "static" or low pressure port and the shape of the bluff body or other deflecting surfaces upstream thereof that comprise the subject matter of the instant invention.

The flowmeters forming the subject matter of the previously noted patent as well as other patented configurations owned by the assignee hereof all share the problem of widely varying flow correction coefficients as the rate of flow, best characterized by the flow Reynolds number, varies. Moreover, the repeatability of the results is adversely affected by free stream turbulence. A detailed analysis of a large body of performance data has revealed that the cause of the problems is the location of the low pressure port in the downstream side of a bluff body having a circular cross section. On the other hand, the location of the low pressure port at this point also has certain important advantages among which is the fact that it produces a pressure below the local free stream static pressure due to its being in the wake of the bluff body. The resulting differential pressure is correspondingly larger which contributes to greater system accuracy when coupled to most differential pressure measurement devices while broadening the useful range of the instrument. If one relocates the low pressure port at a site where it is essentially isolated from the wake effects, the resultant differential output is substantially reduced in magnitude and, therefore, usually becomes less accurate and versatile. Accordingly, the sought-after solution is one of preserving the large magnitude differential pressure output signal while, at the same time, both stabilizing and improving its repeatability over a broad range of flow conditions.

It has now been found in accordance with the teaching of the instant invention that these and other desirable attributes of an averaging pitot-type flowmeter can, in fact, be achieved by the simple, yet unobvious, expedient of leaving the low pressure port located on the downstream side of the bluff body either in the latter or a separate element and forcing the fluid boundary layer to separate from the flowmeter at a fixed and predetermined location over a broad range of flow conditions while, at the same time, shaping and positioning the surfaces downstream of such boundary layer separation sites so that the boundary layer cannot become reattached. From a physical standpoint the foregoing requires providing the bluff body itself or other upstream flow deflecting means with a pair of sharply contoured breakaway edges arranged in transversely-spaced relation on opposite sides thereof. The upstream-facing impact surface bridging the space between these breakaway edges must be shaped to direct the stream of flowing fluid thereover, i.e. not shield them. Of equal importance is the downstream-facing surface containing the low pressure port located downstream of the breakaway edges. This downstream-facing portion of the flowmeter must be so shaped and oriented relative to the breakaway edges upstream thereof that the boundary layer cannot reattach itself thereto over a broad range of flow rates because, if it does, the flow correction coefficient will change markedly and, under some conditions, become unreliable due to lack of repeatability.

It is, therefore, the principal object of the present invention to provide a novel method for stabilizing the flow correction coefficient for an averaging pitot-type flowmeter having a sensing port therein facing downstream.

A second objective is the provision of an improved pitot tube type flowmeter constructed in accordance with the foregoing method.

Another object is the provision of a method for stabilizing flow correction coefficients in pitot-type flowmeters which preserves the large magnitude differential pressure readout which is a prime advantage in a meter of the character described having a downstream-facing port for sensing the lower component of the measured differential pressure.

Still another object is to provide an improved flowmeter of the type forming the subject matter of U.S. Pat. No. 3,581,565 wherein the bluff body or other flow deflecting means located upstream of the static port is reshaped and sharply contoured along both sides to establish predetermined and fixed boundary layer breakaway margins.

An additional object is the provision of an improved flow measuring apparatus whose flow correction coefficient remains essentially unaffected by the local transition between laminar and turbulent flow at the apparatus.

Further objects are to provide a flow meter that is accurate, versatile, dependable, easy to service, relatively inexpensive, simple to install, rugged, provided a minimal impediment to normal flow, requires only a single wall penetration, and is even decorative in appearance.

Other objects will be in part apparent and in part pointed out specifically hereinafter in connection with the description of the drawings that follows, and in which.

Figure 9:
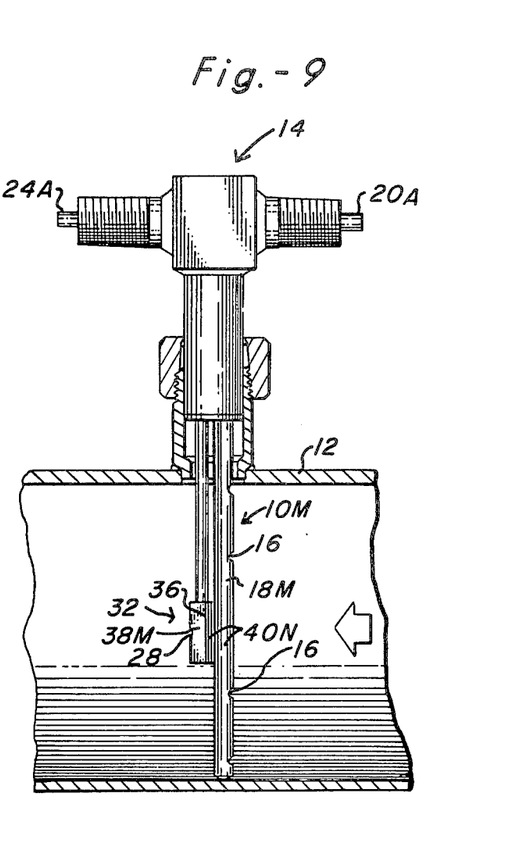
FIG. 9 is a fragmentary half section to essentially the same scale as FIG. 7 showing the flowmeter of the later figure installed in place within a pipe.

Referring initially to FIGS. 1, 2, 3, 7 and 9 of the drawings and to U.S. Pat. No. 3,581,565 previously mentioned, it is worthy of note that each and every version of the flowmeter shown therein includes what will be denominated here a probe which has been broadly designated by reference numeral 10 and which when in use is housed inside pipe or conduit 12 as shown in FIG. 9 along with certain external hardware which, in like manner, has been broadly designated by reference numeral 14. This external hardware forms no part of the present invention and its function is merely that of delivering the two fluid pressure values sensed inside the pipe by reason of the fluid flowing therein to suitable or recording instruments located outside the pipe. Such instrumentation, likewise, forms no part of the invention and, for this reason, no attempt has been made to illustrate same.

The basic features of the probe 10 itself are also well known and clearly disclosed in the patent already referred to. For instance, the number, location and function performed by the upstream-facing sensing ports 16 in the bluff body 18 remain precisely the same as ports A-1, A-2, B-1 and B-2 in the so-called "hollow outer body" 32 of the patented flowmeter, element 18M of the version shown in FIGS. 7, 8 and 9 hereof being substantially identical to the latter.

As is the case with the patented flowmeter, bluff bodies 18 and 18M have no upstream-facing port 16 located such that it will be on the axis of the conduit 12 when positioned inside thereof as shown in FIG. 9. An interpolating tube 20 corresponding to element 34 of the patent is located inside the bluff body which, of course, is hollow. This interpolating tube contains an upstream-facing shielded port 22 positioned on approximately the axis of pipe 12 when the unit is in place as revealed in FIG. 9. Port 22 of the interpolating tube 20 cooperates with the upstream-facing ports 16 in the bluff body to average the fluid pressure sensed by the latter across the entire flow profile within pipe 12. As such, the bluff body with its upstream-facing ports and the interpolating tube coact in the manner of the patented flowmeter to define a so-called "impact probe" effective to sense the average pressure of the fluid flowing thereover. All of the probes illustrated include an interpolating tube 20 as is apparent from FIGS. 1, 4, 5, 6, 7 and 8. Internal passages (not shown) connect interpolating tube 20 with tube 20A that forms part of the externl hardware 14. Each of the various flowmeter designs illustrated also includes a low pressure tube 24. This tube 24 contains a downstream-facing port 26 which is also located on the pipe axis when the flowmeter is in place as shown in FIG. 9. In the versions of FIGS. 1, 2, 3, 4, 5 and 6, this tube is located inside the hollow bluff body with the low pressure port 26 therein positioned to register with a passage 28 in the bluff body that opens downstream. As was the case with interpolating tube 20, static tube 24 is connected to external piping 24A through internal passages (not shown).

Figure 7:
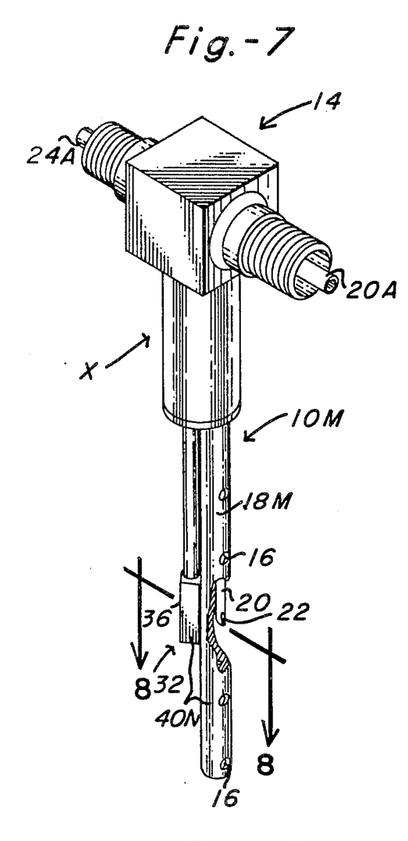
FIG. 7 is a perspective view of yet a fourth version of the flowmeter but to a somewhat reduced scale, portions thereof having also been broken away to reveal the interior construction.
Figure 8:
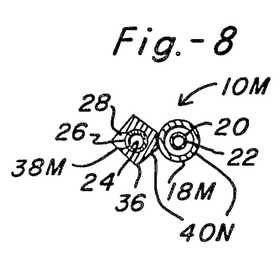
FIG. 8 is a section taken along line 8—8 of FIG. 7.

The version of FIGS. 7, 8 and 9 is designed especially for small diameter pipes where the large bluff bodies of the other versions would materially obstruct the flow therethrough. Thus, by locating the static tube outside the bluff body, the size of the latter can be significantly reduced. A look at FIGS. 7 and 9 will show that the static tube is much smaller than the bluff body and lies downstream of the latter in shielded relation therebehind. At the point where downstream-facing low pressure port 26 is found, flow deflecting means indicated in a general way by numeral 32 is located, the latter element performing the exact same controlled flow deflecting function as the reshaped bluff bodies 18A, 18B and 18C of the versions shown in FIGS. 1, 2 and 3, respectively.

With the foregoing as a background, emphasis will next be concentrated upon those improvements which constitute the novel aspects of the instant invention, namely, the shaping of the surfaces over and around which the fluid flows as it moves past the downstream-facing static port 26 in static tube 24. In each of the several embodiments illustrated, a pair of sharply contoured breakaway edges 36 are provided in spaced relation on opposite sides of and upstream of the downstream-facing static tube port 26 separated from the latter by downstream-facing sharply convergent surfaces 38. The upstream-facing impact surface or surfaces 40 located upstream of the sharply contoured edges 36 are much less significant than the sharply contoured edges themselves provided that they divide the flow approximately equally and cause one-half thereof, on a time-average basis, to flow across one sharply contoured edge while the other half flows across the other sharply contoured edge of the pair. As such, impact surface or surfaces 40 should be symmetrical about a plane defined by the pipe axis and probe axis when the flowmeter is positioned as shown in FIG. 9.

Figures 1, 2, 3, 4, 5, 6:
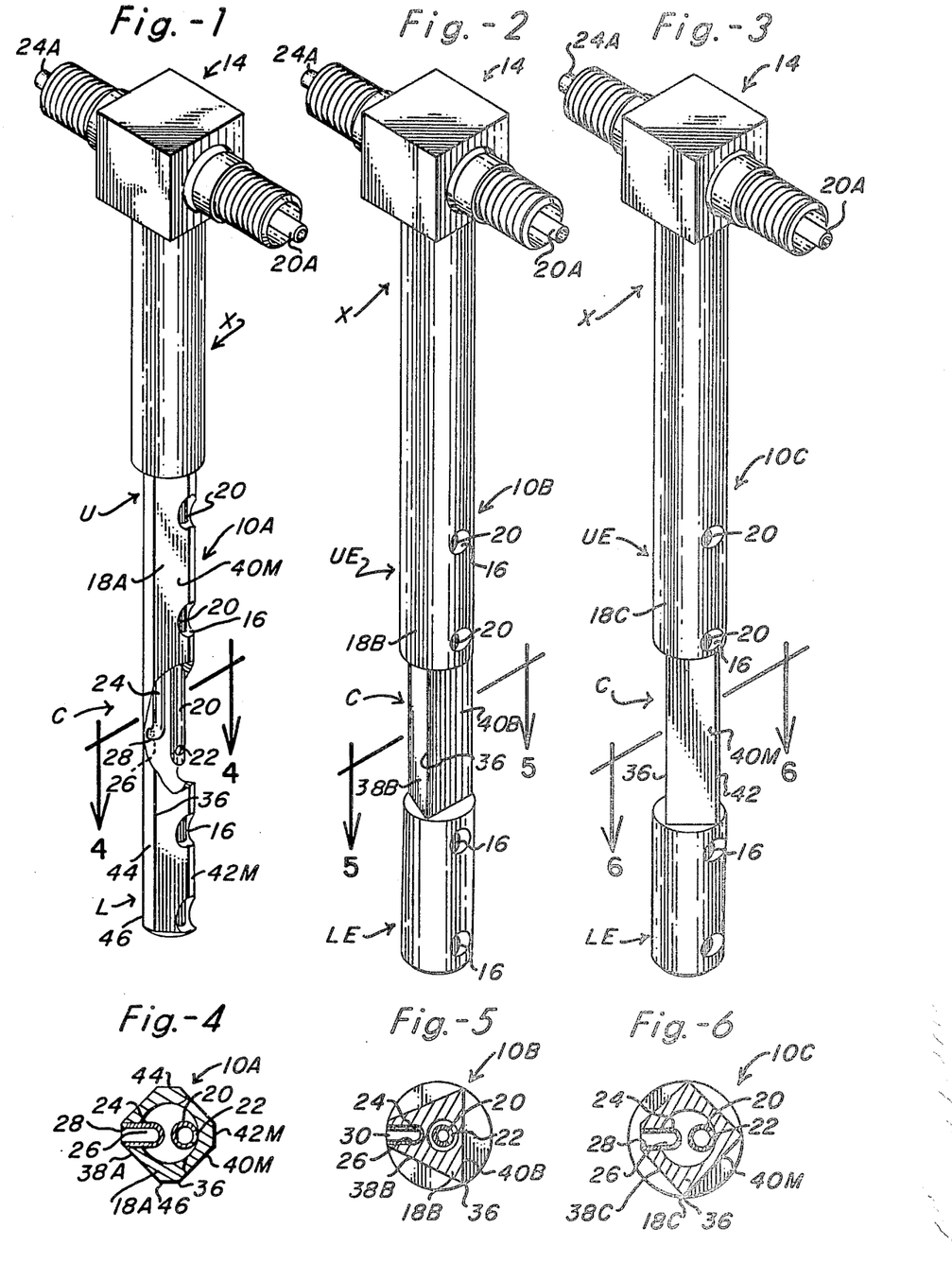
FIGS. 1, 2 and 3 are perspective views to the same scale of three different pitot tube type flowmeters in which the primary difference therebetween lies in the shape of the bluff body or other flow deflecting means lying immediately upstream of that portion thereof containing the downstream-facing port used to sense the static pressure, the bluff body of FIG. 1 being basically diamond-shaped with chamfered corners and having certain portions broken away to reveal the interior construction while those of FIGS. 2 and 3 are more nearly triangular and truly diamond-shaped, respectively.
FIGS. 4, 5 and 6 are sections taken along lines 4—4, 5—5 and 6—6, respectively, of FIGS. 1, 2 and 3.

While on the subject of the upstream-facing impact surfaces, a look at FIGS. 2 and 5 will reveal the simplest of surfaces, namely a single planar surface 40B on bluff body 18B of probe 10B to be disposed perpendicular to the flow. Of the several such surfaces shown, this one shown in FIGS. 2 and 5 is the most difficult to manufacture due to the reduced internal cross section available for the internal tubing.

A more satisfactory division of the flow can be accomplished through the use of a pair of oppositely-inclined surfaces 40M that cooperate with one another to divide the flow and deflect approximately half across each of the two sharply contoured edges defining the side margins thereof. Oppositely-inclined surfaces of this type have been shown one the bluff bodies 18A of probe 10A of the version shown in FIGS. 1 and 4 as well as bluff body 18C of probe 10C shown in FIGS. 3 and 6. Surfaces 40M in FIGS. 3 and 6 intersect one another in a sharp leading edge 42 while those of FIGS. 1 and 3 intersect in a blunted edge 42M.

Surfaces 40N on the flow deflection means 32 of the probe 10M shown in FIGS. 7-9 are somewhat more steeply inclined than those of FIGS. 1, 3, 4 and 6 which are disposed at approximately right angles to one another as shown. The leading edge 42N of deflection means 32 is shielded by the bluff body 18M upstream thereof and, for this reason, is of little functional significance. Actually, in FIGS. 7-9, the upstream-facing impact surface 40N is a compound one consisting of both the cylindrical surface of the bluff body 18M and the divergent planar surfaces of the flow control shield located upstream of the latter's sharply contoured edges 36. In any event, these symmetrical surfaces 40N cooperate to divide the flow approximately equally and deliver half thereof to both sharply contoured edges.

Finally, on the subject of the upstream-facing impact surface or surfaces 40, a convex rounded surface leading into the sharply contoured edges 36 is to be avoided because such surfaces fail to define a clear-cut breakway contour where the boundary layer is forced to leave the surface of the probe under a variety of flow conditions. Concave, divergent and curved upstream-facing impact surfaces leading into the sharply contoured side margins will work just fine insofar as producing a well defined edge where the boundary layer can be depended upon to breakway under varied flow conditions; nevertheless, such concave surfaces are also to be avoided since they complicate the manufacture of the probe with no attendant advantages over the oppositely-inclined planar surfaces.

The most critical feature of all is the sharply contoured edges 36 spaced on opposite sides of the downstream-facing low pressure port 26 positioned and adapted to deflect the flow therearound while, at the same time, localizing the point at which boundary layer separation takes place. In each instance, these edges are relatively sharp. Edges such as this have been found to force the boundary layer to breakway from the sides of the probe at precise locations even through the flow rates, characteristics of the fluid and other factors vary widely. Any significant rounding of these sharply contoured breakway surfaces 36 allows the point at which the boundary layer separates from the probe to move around such a curved surface as a function of Reynolds number thus introducing the very inaccuracies that the instant improvement is designed to eliminate.

In the particular form shown, both of the sharply contoured breakway edges 36 are essentially coplanar, parallel, perpendicular to the flow and spaced equidistant on opposite sides of the pipe axis in installed condition. While desirable, these relationships are not especially critical although other operating characteristics of the probe may, and often are, adversely affected if they are not maintained. In other words, if one of the breakway edges 36 were nearer to the side of the pipe than the other, this would indicate the probe itself is not positioned diametrically thereof and, as such, it would not be sensing the true cross section of the flow. Probably the best and simplest way to look at these relationships is that no useful purpose is served by doing anything other than making them parallel and keeping them in a plane normal to the flow spaced equidistant on opposite sides of the pipe axis; and besides, this is the simplest way to make the unit.

Specific reference should, perhaps, be made to the version of FIGS. 1 and 4 where it will be seen that the sharply contoured edges 36 comprise the leading or upstream edges of a pair of oppositely-facing essentially parallel flats 44 of significant width. Actually, sharply contoured edges 36 are where the boundary layer separation takes place and neither surfaces 44 nor downstream edges 46 at the juncture between these flats and the sharply convergent downstream-facing surfaces 38 interferes therewith provided that these flats are kept narrow enough so that they always remain in the wake of the fluid flowing past the probe. In other words, neither the shape nor the location of any probe surface downstream of sharply contoured edges 36 is of any consequence so long as it remains in the wake of the fluid flowing past the probe over the full range of flow conditions that the flowmeter is intended to measure. This is true not only of flats 44, but the downstream-facing convergent surface 38 as well, because if the flowing fluid can reattach itself to any probe surface downstream of sharply contoured breakaway edges 36, then the sought-after stability in the pressure sensed at the downstream-facing low pressure port is lost unless, as will be explained presently in connection with FIGS. 7, 8 and 9, other sharply contoured breakaway surfaces are provided downstream but still upstream of the low pressure port. Flats 3/16 inches wide or so have caused no problem in the flowmeters like those of FIGS. 1-6 which are designed for use in large diameter pipes.

Next, with reference to FIGS. 4, 5, 6 and 8, it will be seen that each pair of the downstream-facing surfaces 38 is rather sharply convergent, those 38A and 38C of probes 10A and 10C, respectively (FIGS. 4 and 6) being somewhat more steeply inclined than those 38B of probe 10B (FIG. 2). Surfaces 38A, 38B and 38C, mentioned above, each comprises portions of their respective bluff bodies 18A, 18B and 18C while analogous convergent surfaces 38M of the probe 10M shown in FIG. 8 comprise a part of flow deflection means 32 and not bluff body 18M although functionally, their purpose and effect are the same, namely that of eliminating any surface downstream of sharply contoured breakaway, edges 36 to which the boundary layer can reattach itself over the range of flow conditions the flowmeter is designed to measure. Here, even more than was the case with the upstream-facing impact surfaces 40, the particular shape of these downstream-facing surfaces is insignificant since the one and only criteria therefor is that they remain in the wake of the fluid flowing around the probe under the full range of flow conditions the flowmeter is intended to measure. Simply stated, their shape is unimportant. The particular surfaces shown are all planar and symmetrical about a plane paralleling the fluid flow and containing the low pressure port just because such surfaces are the easiest to fabricate and no useful purpose would be served by making them some other more complex shape or the shape of one such surface different from its companion surface on the opposite side of the low pressure port.

Lastly, it is worthy of note that in each of the four embodiments of the probe illustrated, the specialized contouring just described is present in the medial section generally designated by reference character C of each flowmeter. It is in this medial section, of course, that the low pressure port 26 is located and around which the flow must be directed. Now, in the versions of FIGS. 2 and 3, the specialized contouring is confined to this medial section while the upper and lower end sections JE and LE, respectively, remain cylindrical. The version of FIG. 1, on the other hand, is somewhat different in that upper end section J as well as lower end section L both have precisely the same specialized contour as center section C. The cylindrical section X in all four versions, of course, lies outside the pipe as illustrated in FIG. 9 so that it has no influence on the fluid flowing inside the latter.

Again, the version of FIG. 7 is somewhat of a specialized case in that its medial section CM comprises a part of flow deflecting means 32 and not the bluff body 18M which remains cylindrical throughout its length. Nevertheless, functionally, medial section CM is essentially the same as medial sections C of the large pipe versions shown in FIGS. 1, 2, and 3.

Somewhat better overall performance has been realized by carrying the special contouring found in the medial sections C and CM into both the upper and lower end sections as has been done with the FIG. 1 version although to do so is by no means critical. On the other hand, it has been found that if these specially contoured surfaces terminate too far short of the nearest pair of impact ports 16, the performance begins to fall off rather significantly. The small pipe version of FIG. 7 has its own special application and for large pipe applications there is little, if any, advantage in the FIG. 1 version over that of FIG. 3 especially if the special contouring of the center section of FIG. 3 were extended to both end sections of the probe.

As far as the method is concerned, it consists of the simple, yet unobvious expedient of localizing the areas on the probe where boundary layer separation occurs under various flow conditions by sharply contouring these surfaces to define sharp edges shaping the surfaces upstream of these sharply contoured edges so as to divide the flow and direct it thus divided across the latter, and finally positioning the downstream-facing low pressure port and all edges separating same from the sharply contoured surfaces to lie always within the wake of the fluid flowing over the latter over a predetermined range of flow conditions.

What is claimed is:

1. In a pitot tube type flowmeter for measuring differential pressures having a probe insertable into a stream of fluid flowing within a pipe, said probe including an upstream-facing surface against which said flowing fluid impacts and a downstream-facing surface located downstream of the latter containing a downstream-facing port for sensing the low pressure component of the measured differential, the improvement which comprises: a pair of sharply contoured edges located in transversely-spaced relation on opposite sides of said probe intermediate said upstream and downstream-facing surfaces, said upstream-facing surface being contoured to divide the flow and direct essentially equal parts thereof across said sharply contoured edges, and said downstream-facing surface being shaped to continuously lie within the wake of the fluid flowing past the sharply contoured edges over a predetermined range of flow conditions.

2. The improved flowmeter as set forth in claim 1 wherein the sharply contoured edges are coplanar, parallel and susceptible of being oriented perpendicular to the line of flow.

3. The improved flow meter as set forth in claim 1 wherein the sharply contoured edges extend the full length of the probe.

4. The improved flowmeter as set forth in claim 1 wherein the downstream-facing port is located midway between the ends of the probe and where the sharply contoured edges are confined to the medial portion of the probe containing said port.

5. The improved flowmeter as set forth in claim 1 wherein the upstream-facing surface is planar with the sharply contoured edges constituting the opposite side margins thereof.

6. The improved flowmeter as set forth in claim 1 wherein the upstream-facing surface has a generally V-shaped cross section.

7. The improved flowmeter as set forth in claim 1 wherein the downstream-facing surface is convergent.

8. The improved flowmeter as set forth in claim 1 wherein the downstream-facing surface has a generally V-shaped cross section.

9. The improved flowmeter as set forth in claim 1 wherein the upstream-facing surface, the downstream-facing surface and the sharply contoured edges therebetween cooperate to define a probe having a generally triangular cross section in the area of the downstream-facing port.

10. The improved flowmeter as set forth in claim 1 wherein the upstream-facing surface, the downstream-facing surface and the sharply contoured edges therebetween cooperate to define a probe having a generally diamond-shaped cross section in the area of the downstream-facing port.

11. The improved flowmeter as set forth in claim 1 wherein the upstream-facing surface, the downstream-facing surface and the sharply contoured edges therebetween cooperate to define a probe having a generally square cross section in the area of the downstream-facing port.

12. The improved method for stabilizing the pressure sensed by the downstream-facing port of a pitot tube type flowmeter located in the wake of divergent streams of fluid split by an upstream-facing surface of the latter which comprises: directing the streams thus divided across a pair of shaply contourded edges of said tube located in transversely-spaced relation on opposite sides of said downstream-facing port to effectively fix the downstream terminii of the boundary layers of said streams at said edges, and maintaining all surfaces downstream of said edges within the wake of said divided streams to prevent reattachment of said boundary layers thereto.

13. The improved method as set forth in claim 12 wherein the sharpened side margins are located in a common plane normal to the direction of flow.

14. The improved method as set forth in claim 12 where the sharpened margins parallel one another spaced equidistant on opposite sides of the axis of flow.

* * * * *

REEXAMINATION CERTIFICATE (777th)
United States Patent [19]
Harbaugh et al.

[11] B1 4,154,100
[45] Certificate Issued  Nov. 3, 1987

[54] METHOD AND APPARATUS FOR STABILIZING THE FLOW COEFFICIENT FOR PITOT-TYPE FLOWMETERS WITH A DOWNSTREAM-FACING PORT

[75] Inventors: James B. Harbaugh, Lakewood, Colo.; Edward F. Brooks, Lawndale, Calif.; Norman A. Alston, Boulder, Colo.

[73] Assignee: Delaware Capital Formation, Inc., Wilmington, Del.

Reexamination Request:
No. 90/000,994, Apr. 23, 1986

Reexamination Certificate for:
Patent No.: 4,154,100
Issued: May 15, 1979
Appl. No.: 867,778
Filed: Jan. 9, 1978

[51] Int. Cl.⁴ ............... G01F 1/46; G01D 5/165
[52] U.S. Cl. ..................................... 73/861.66
[58] Field of Search ........... 73/861.65, 861.66, 861.67, 73/861.68

[56] References Cited
U.S. PATENT DOCUMENTS 1,110,023  9/1914  Wilkinson ............... 73/861.66
3,751,982  8/1973  Lambert ............... 73/861.66

FOREIGN PATENT DOCUMENTS 1168659  6/1961  Fed. Rep. of Germany .

Primary Examiner—Herbert Goldstein

[57] ABSTRACT

This invention relates to the novel method for stabilizing the pressure sensed by the downstream-facing port of a pitot tube type flowmeter over a broad flow range, thereby providing a stable and repeatable flow coefficient. The invention comprises localizing the areas of boundary layer separation across deflecting surfaces located upstream of said port by sharply contouring the edges thereof and directing the flowing stream thereacross, and preventing reattachment of said boundary layer by positioning and contouring the surfaces containing said port downstream of said sharply contoured edges so as to continuously lie within the wake of the fluid flowing around the latter over a broad range of flow rates. The invention also encompasses the improved averaging pitot-type flowmeter characterized by flow detecting means having sharply contoured edges on both sides thereof effective to fix the location at which boundary layer separation occurs over a broad range of laminar and turbulent flow conditions, an upstream-facing impact surface shaped to direct the flowing fluid across said sharply contoured edges, and a downstream-facing surface containing a port for sensing downstream pressure so contoured and positioned relative to said sharply contoured edges as to cooperate therewith in preventing reattachment of the boundary layer under varying flow conditions.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 29-55:

Other objects will be in part apparent and in part pointed out specifically hereinafter in connection with the description of the drawings that [follows] *follow*, and in which:

FIGS. 1, 2 and 3 are perspective views to the same scale of three different pitot tube type flowmeters in which the primary difference therebetween lies in the shape of the bluff body or other flow deflecting means lying immediately upstream of that portion thereof containing the downstream-facing port used to sense the static pressure, the bluff body of FIG. 1 being basically diamond-shaped with chamfered corners and having certain portions broken away to reveal the interior construction while those of FIGS. 2 and 3 are more nearly triangular and truly diamond-shaped, respectively;

FIGS. 4, 5 and 6 are sections taken along lines 4—4, 5—5 and 6—6, respectively, of FIGS. 1, 2 and 3;

FIG. 7 is a perspective view of yet a fourth version of the flowmeter but to a somewhat reduced scale, portions thereof having also been broken away to reveal the interior construction;

FIG. 8 is a section taken along line 8—8 of FIG. 7; [and,]

FIG. 9 is a fragmentary half section to essentially the same scale as FIG. 7 showing the flowmeter of the later figure installed in place within a pipe[.]*;* and

*FIGS. 10 and 11 are schematics illustrating the concave nature of the upstream-surfaces of the flowmeters.*

Column 5, lines 50-64:

Finally, on the subject of upstream-facing impact surface or surfaces 40, a convex rounded surface leading into the sharply contoured edges 36 is to be avoided because such surfaces fail to define a clear-cut [breakway] *breakaway* contour where the boundary layer is forced to leave the surface of the probe under a variety of flow conditions. Concave, divergent and curved upstream-facing impact surfaces, *such as surfaces 40' and 40'' shown in FIGS. 10 and 11, respectively,* [leading into] *which are concave throughout essentially their entire length from a location coplanar with the upstream-facing port 16 to* the sharply contoured side margins 36 will work just fine insofar as producing a well defined edge where the boundary layer can be depended upon to [breakway] *breakaway* under varied flow conditions; nevertheless, such concave surfaces are also to be avoided since they complicate manufacture of the probe with no attendant advantages over the oppositely-inclined planar surfaces.

The drawing figures have been changed as follows: FIGS. 10 and 11 have been added to illustrate the concave nature of the upstream-facing surfaces of the flowmeter.

AS A RESULT OF REEXAMINATION, IT HAS BEEN DETERMINED THAT:

Claims 1 and 12-14 are determined to be patentable as amended.

Claims 2-11, dependent on an amended claim, are determined to be patentable.

New claims 15 and 16 are added and determined to be patentable.

1. In a pitot type flowmeter for measuring differential pressures having a probe insertable into a stream of fluid flowing within a pipe, said probe including an upstream-facing surface against which flowing fluid impacts *with a boundary layer being formed by fluid flowing over said probe* and a downstream-facing surface located downstream of [the latter] *said upstream-facing surface and containing* a downstream-facing port for sensing the low pressure component of the measured differential, the improvement which comprises: a pair of sharply contoured edges located in transversely-spaced relation on opposite sides of said probe intermediate said upstream and downstream-facing surfaces, said upstream-facing surface [being contoured to divide the flow] *having portions which are planar and which diverge away from each other in the flow direction immediately upstream of said sharply contoured edges* and [direct] *which redirect* essentially equal parts thereof *along divergent paths* across said sharply contoured edges *so that boundary layer separation from the probe occurs precisely at said sharply contoured edges,* and said downstream-facing surface being shaped *and positioned such that once the boundary layer has separated from the surface of the probe and has been redirected away therefrom it cannot reattach thereto over a predetermined range of flow conditions thus leaving the downstream-facing surface* to [continuously] lie *at all times* within the wake of the fluid [flowing past the sharply contoured edges over a predetermined range of flow conditions] *redirected around said downstream-facing surface.*

12. The improved method for stabilizing the pressure sensed by the downstream-facing port of a pitot tube type flowmeter located in the wake of divergent streams of fluid split by an upstream-facing surface of the latter which comprises: providing a precisely fixed point *of boundary layer separation from the upstream-facing surface by providing a pair of planar surfaces which diverge in the direction of fluid flow,* directing the streams thus divided *along divergent paths* across a pair of sharply contoured edges of said tube located in transversely-spaced relation on opposite sides of said downstream-facing port to [effectively] *precisely* fix the downstream terminii of the boundary layers of said streams at said edges, and maintaining all surfaces downstream of said edges within the wake of said [divided] *divergent* streams to prevent reattachment of said boundary layers thereto.

13. The improved method as set forth in claim 12 wherein the [sharpened side margins] *sharply contoured edges* are located in a common plane normal to the direction of flow.

14. The improved method as set forth in claim 12 where the [sharpened margins] *sharply contoured edges* parallel one another spaced equidistant on opposite sides of the axis of flow.

*15. In a pitot tube type flowmeter for measuring differential pressures having a probe insertable into a stream of fluid flowing within a pipe, said probe including an upstream-facing surface having an upstream-facing port with flowing fluid impacting against said upstream-facing surface with a boundary layer being formed by fluid flowing over said probe and a downstream-facing surface located downstream of said upstream-facing surface containing a downstream-facing port for sensing the low pressure component of the measured differential, the improvement which comprises: a pair of sharply contoured edges located in transversely-shaped relation on opposite sides of said probe between said upstream and downstream-facing surfaces, said upstream-facing surface being concave throughout essentially its entire length from a location coplanar with said upstream-facing port to said sharply contoured edges to prevent separation of the fluid of the fluid boundary layer from said probe upstream-facing surface while simultaneously dividing and redirecting essentially equal parts of the flow along divergent paths across said sharply contoured edges for all flow conditions to which said probe will be subjected, said downstream-facing surface being shaped and positioned such that once the boundary layer has separated from the surface of the probe at said sharply contoured edges and has been redirected away therefrom it cannot reattach thereto over essentially the entire range of flow conditions to which said probe will be subjected thus leaving the downstream-facing surface to lie at all times within the wake of the fluid redirected around said downstream-facing surface.*

*16. The improved method for stabilizing the pressure sensed by a downstream-facing port of a pitot tube type flowmeter located in the wake of divergent streams of fluid split by an upstream-facing surface of the flowmeter, the flowmeter including an upstream-facing port, the improved method comprising: providing a fixed and precisely determined point of separation of the boundary layer from the probe by providing a pair of sharply contoured edges on said flowmeter located in transversely-spaced relation on opposite sides of the downstream-facing port, providing a concave curvature to the upstream-facing surface which extends continuously for essentially the entire length of said upstream-facing surface from a location coplanar with said upstream-facing port to said sharply contoured edges to prevent separation of the boundary layer from said upstream-facing surface, splitting the of fluid flowing over said upstream-facing surface into streams, directing said streams thus split along divergent paths across said sharply contoured edges, precisely fixing the downstream terminii of the boundary layers of said streams at said sharply contoured edges, and maintaining all surfaces downstream of said sharply contoured edges within the wake of said divergent streams to prevent reattachment of said boundary layers to said flowmeter.*

* * * * *